Sept. 22, 1931.    F. H. OWENS    1,824,294

SOUND AND PICTURE FILM MATCHING MEANS

Filed March 8, 1929

INVENTOR.
FREEMAN H. OWENS.
BY
ATTORNEY

Patented Sept. 22, 1931

1,824,294

UNITED STATES PATENT OFFICE

FREEMAN H. OWENS, OF NEW YORK, N. Y., ASSIGNOR TO OWENS DEVELOPMENT CORPORATION, OF NEW YORK, N. Y.

SOUND AND PICTURE FILM MATCHING MEANS

Application filed March 8, 1929. Serial No. 345,576.

My invention relates to a sound and picture film matching means and has for its primary object the provision of means whereby if a film break should occur during the reproduction of a picture film and a separate sound film corresponding thereto, in either the picture film or the sound film, the operator may quickly and easily match the two films so that when they are again fed through the apparatus for reproduction, the sound film will be in proper synchronism with the picture film.

In the art of reproducing photographic sound records, synchronously with motion picture, wherein the picture film is entirely independent and separate from the film bearing the photographic sound record, it is obvious that if a break in either the picture film or sound film should occur during the operation of the machine through which the films are being run, some way must be provided whereby when the break has been repaired, by splicing or insertion of a blank lead strip, the sound film and the picture film will upon continued use be properly synchronized.

I have provided a means whereby such a contingency may be taken care of very quickly and easily by the operator of the machine and with perfect confidence of accuracy, and eliminating all guess work and the likelihood of having the sound record out of synchronization with the picture film. This is highly important, particularly if the sound record must match a certain movement of one of the characters in the picture film, as for instance a reproduction of a bugle call, the picture of which is shown on the picture film. It is also important even if no particular motion or action on the picture film must be accurately reproduced in sound as for instance in the case of an orchestration scoring for the motion picture. It is important in such a case for the reason that the reproduction of the sound record must end at the proper time with respect to the picture being shown and as is well known, certain types of music are usually arranged to match with certain types of action in the picture.

I will now explain my invention with reference to the figures of the accompanying drawings forming a part of this application and wherein like reference numerals indicate like parts.

In the drawings:—

Figure 1:
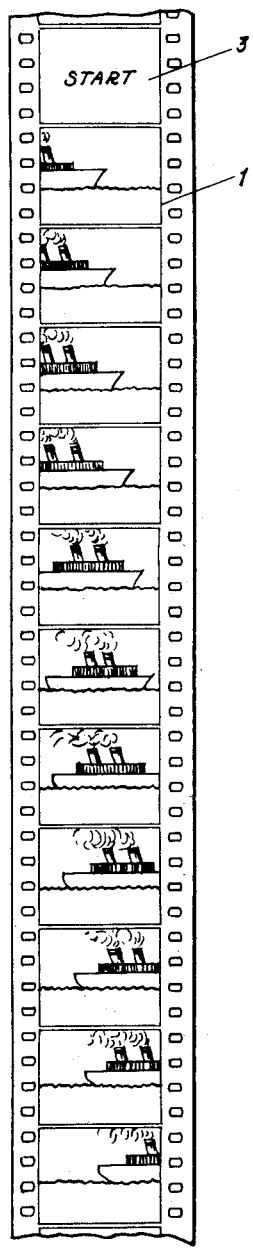
Figure 1 is a detail view of a portion of a strip of motion picture film showing a series of frames having photographed images thereon for projection and reproduction on a screen.
Figure 2:
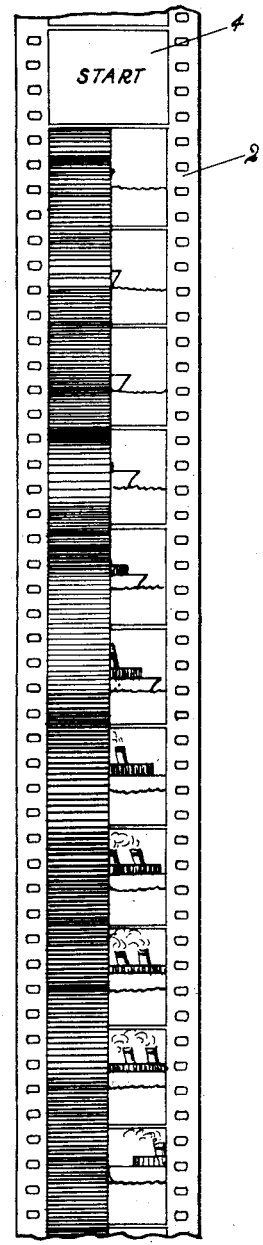
Figure 2 is a similar view of a section of motion picture film bearing a photographic sound record for reproduction synchronously with the motion picture film.

For purposes of description, I will refer to the film shown in Figure 1 as the picture film 1 and the film in Figure 2 as the sound film 2.

Obviously when the sound record is independent of the picture film, the two films must be started simultaneously and at a predetermined starting position in order that the reproduction of both may be properly synchronized. There is usually provided, therefore, at the starting end of the films a frame bearing the word "start" as indicated at 3 in Figure 1 and at 4 in Figure 2.

Assuming now that the picture 1 and the sound film 2 are started simultaneously and at the proper points for synchronous projection and reproduction in a suitable machine designed for that purpose, obviously if no breakage occurs in either film, they will run through simultaneously and at the same speed and the sound will, therefore, continue to synchronize with the picture to the end of the reel. If, however, a break should occur in either one of the films, for instance, in the picture film 1, and it is necessary to again start the machine after rethreading the broken film, it is essential that the operator have some means of shifting the sound film 2 in the machine so that it corresponds to and synchronizes with the picture film at such a new starting point. I make this possible by providing on the sound film 2 symbols or images corresponding frame for frame with identical symbols or images on the picture film.

Obviously, therefore, inasmuch as the films are transparent except for the images thereon, the operator may by laying the sound film over the picture film match up by frames the two films, simply by observing the identical symbols or images thereon and if desired, in some suitable way marking corresponding frames on the two strips as a new starting point. The operator will be assured then that when the machine is rethreaded with the films to such new starting point, the sound reproduction will continue in perfect synchronism with the picture.

Probably the most effective and one of the simplest ways of accomplishing this matching purpose is illustrated in the figures of the drawing and consists in printing upon the sound film 2 a portion of the picture images on the picture film 1. This can be easily done by for instance exposing upon the sound film 2, before the sound is recorded thereon, a half, or more or less, as desired, of the images on the picture film 1 and then before development of the sound film 2, recording the sound appropriate to such picture on the unexposed portion of the film 2, in the usual manner of scoring or printing. Thus, there is provided the sound film 2 which upon development will show a portion of the actual images in the frames of the picture film 1 and the sound record appropriate thereto. It is, therefore, a very simple matter for the operator in case of need, to lay one film over the other and match the partial images showing on the sound film with the images on the picture film.

Sometimes it may be necessary to insert in one of the films a blank strip to compensate for a broken or spoiled section which it has been necessary to cut out. This is often a necessary operation in order that the entire length of films be maintained uniform. In such event, the cutter or splicer finds it very easy and convenient to judge accurately the length of insert by simply matching the two films as above described.

It will be understood that the form of my invention herein shown and described is illustrative only and I do not wish to be limited to such form other than by the appended claim.

I claim:

A film strip having a sound record thereon for reproduction synchronously with a separate picture film, and visible images on said strip corresponding with images on the picture film for matching, said images on the strip comprising partial duplicates of the images on the picture film.

In testimony whereof I affix my signature.

FREEMAN H. OWENS.